(12) United States Patent
Fujii et al.

(10) Patent No.: US 10,137,755 B2
(45) Date of Patent: Nov. 27, 2018

(54) VEHICLE SEAT AIR-CONDITIONING DEVICE

(71) Applicant: DENSO CORPORATION, Kariya, Aichi-pref. (JP)

(72) Inventors: Takahisa Fujii, Kariya (JP); Yasuhiko Niimi, Kariya (JP); Yuusuke Tanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 216 days.

(21) Appl. No.: 15/036,671

(22) PCT Filed: Oct. 30, 2014

(86) PCT No.: PCT/JP2014/005494
§ 371 (c)(1),
(2) Date: May 13, 2016

(87) PCT Pub. No.: WO2015/072103
PCT Pub. Date: May 21, 2015

(65) Prior Publication Data
US 2016/0288612 A1    Oct. 6, 2016

(30) Foreign Application Priority Data
Nov. 18, 2013    (JP) ................................ 2013-237987

(51) Int. Cl.
*B60H 1/00* (2006.01)
*B60N 2/56* (2006.01)
*B60N 2/06* (2006.01)

(52) U.S. Cl.
CPC ..... *B60H 1/00564* (2013.01); *B60H 1/00285* (2013.01); *B60N 2/06* (2013.01);
(Continued)

(58) Field of Classification Search
CPC .. B60H 1/00557; B60H 1/00564; B60H 1/26; B60N 2/44; B60N 2/4876; B60N 2/56; F24F 13/0218; F24F 2013/0608
(Continued)

(56) References Cited

U.S. PATENT DOCUMENTS 3,604,462 A * 9/1971 Dreher ................. B29D 23/001
138/139
6,488,053 B1 * 12/2002 Tadokoro ................ F16L 11/15
138/110
(Continued)

FOREIGN PATENT DOCUMENTS

JP    2007308045 A    11/2007

*Primary Examiner* — Gregory Huson
*Assistant Examiner* — Ryan Faulkner
(74) *Attorney, Agent, or Firm* — Harness, Dickey & Pierce, P.L.C.

(57) ABSTRACT

A connection duct has (i) a duct body that is made of a material having great flexibility, the duct body in which the conditioned air flows and (ii) core members that are made of a material having higher rigidity than the duct body and are arranged, in the duct body, along a flow direction of air, the core members that maintain a cross-sectional shape of the duct body at a specified cross-sectional shape. The core members respectively have (i) an outer plate that is located on an outer peripheral side in the curved portion, (ii) an inner plate that is located on an inner peripheral side in the curved portion, and (iii) a connection plate that connects the outer plate with the inner plate. A length of the outer plate in the flow direction is longer than a length of the inner plate in the flow direction.

7 Claims, 6 Drawing Sheets

(52) U.S. Cl.
CPC ......... *B60N 2/5628* (2013.01); *B60N 2/5657* (2013.01); *B60H 2001/003* (2013.01)

(58) Field of Classification Search
USPC .................................................. 454/120, 902
See application file for complete search history.

(56) References Cited

U.S. PATENT DOCUMENTS

2011/0146828 A1*  6/2011  Donnelly ................ B29C 53/78
                                                                138/137
2011/0226461 A1*  9/2011  Fujii .................. B60H 1/00285
                                                                165/200

\* cited by examiner

VEHICLE SEAT AIR-CONDITIONING DEVICE

CROSS REFERENCE TO RELATED APPLICATIONS

This application is a U.S. National Phase Application under 35U.S.C. 371of International Application No. PCT/JP2014/005494 filed on Oct. 30, 2014 and published in Japanese as WO 2015/072103 A1 on May 21, 2015. This application is based on and claims the benefit of priority from Japanese Patent Application No. 2013-237987 filed on Nov. 18, 2013. The entire disclosures of all of the above applications are incorporated herein by reference.

TECHNICAL FIELD

The present disclosure relates to a vehicle seat air-conditioning device that blows a conditioned air supplied from an interior air-conditioning unit.

BACKGROUND ART

Conventionally, such a vehicle seat air-conditioning device is known as described in, for example, Patent Literature 1. A vehicle seat air-conditioning device of Patent Literature 1 has a seat air-conditioning duct and a connection duct. The seat air-conditioning duct guides a conditioned air supplied from an interior air-conditioning unit to a location around a seat of a vehicle. The connection duct has one end fixed to the seat air-conditioning duct and the other end fixed to the seat, and guides the conditioned air to the seat.

The connection duct has a portion (referred to as a bellows portion hereafter) having a bellows shape to adapt a displacement of the seat. The bellows portion is arranged linearly to shrink or stretch in conjunction with the displacement of the seat.

For another example of a structure of the connection duct, the connection duct is disposed such that the bellows portion is bent to have a U-shape, and the bellows portion shrinks, stretches, or deforms in conjunction with a displacement of the seat.

PRIOR ART LITERATURES

PATENT LITERATURE

Patent Literature 1: JP 2007-308045 A

SUMMARY OF INVENTION

However, a slide amount of the seat may be very large depending on a type of vehicle. According to the vehicle seat air-conditioning device in which the bellows portion of the connection duct arranged linearly, the connection duct may not function when the bellows portion stretches to be longest, although the connection duct functions when the bellows portion shrinks to be shortest. That is, when the bellows portion stretches to be longest, an air passage in the connection duct may be obstructed. Alternatively, the connection duct functions when the bellows portion stretches to be longest, and the connection duct may not function when the bellows portion shrinks to be shortest. That is, the bellows portion may not be able to shrink because the bellows portion is bulky. The connection duct may function if a dimensional difference between a largest diameter and a smallest diameter of the bellows portion increases. However, in such a case, a size of the connection duct increases, and the connection duct may not be able to be housed in a space under the seat when the space is small (e.g., a dimension of the space in an upper-lower direction is about 30 mm).

According to the vehicle seat air-conditioning device in which the bellows portion of the connection duct is disposed to be bent in the U-shape, the connection duct easily adapt to the displacement of the seat if the slide amount of the seat is large. However, the connection duct may not be able to be housed in the space under the seat because a bend radius becomes large. On the other hand, when the bend radius is small, the air passage in the connection duct may be easily obstructed due to a buckling of the bellows portion.

The present disclosure addresses the above-described issues, and it is an objective of the present disclosure to provide a vehicle seat air-conditioning device in which a connection duct is arranged to be bent such that a dimension of the connection duct in an upper-lower direction can be smaller.

A vehicle seat air-conditioning device according to a first aspect of the present disclosure blows a conditioned air from a seat. The conditioned air is supplied from an interior air-conditioning unit that performs an air conditioning for an indoor space of a vehicle compartment. The vehicle seat air-conditioning device has a seat air-conditioning duct and a connection duct. The seat air-conditioning duct has one end communicating with the interior air-conditioning unit and an other end arranged at a location adjacent to the seat and guides the conditioned air to the location adjacent to the seat. The connection duct has one end communicating with the seat air-conditioning duct and an other end communicating with the seat and guides the conditioned air to the seat. The connection duct is bent at a middle part of the connection duct to form a curved portion of which location varies in conjunction with a displacement of the seat. The connection duct has a duct body and core members. The duct body is made of a material having great flexibility, and the conditioned air flows in the duct body. The core members are made of a material having higher rigidity than the duct body and are arranged, in the duct body, along a flow direction of air. The core members maintain a cross-sectional shape of the duct body at a specified cross-sectional shape. The core members respectively have (i) an outer plate that is located on an outer peripheral side in the curved portion, (ii) an inner plate that is located on an inner peripheral side in the curved portion, and (iii) a connection plate that connects the outer plate with the inner plate. A length of the outer plate in the flow direction is longer than a length of the inner plate in the flow direction.

According to the first aspect, the connection duct can be easily bent until two adjacent inner plates of two adjacent core members are put in condition of being in contact with each other or being close to each other. Therefore, as compared to a structure in which the bellows portion is arranged to be bent as conventionally, a bend radius of the curved portion can be smaller, and the dimension of the connection duct in the upper-lower direction in condition where the connection duct is being bent can be smaller.

Furthermore, since the core members support the duct body to maintain the cross-sectional shape at the specified cross-sectional shape, an obstruction of an air passage in the connection duct, which is caused by a buckling of the connection duct, can be suppressed.

Alternatively, a vehicle seat air-conditioning device according to a second aspect of the present disclosure blows a conditioned air from a seat. The conditioned air is supplied from an interior air-conditioning unit that performs an air conditioning for an indoor space of a vehicle compartment. The vehicle seat air-conditioning device has a seat air-conditioning duct and a connection duct. The seat air-conditioning duct has one end communicating with the interior air-conditioning unit and an other end arranged at a location adjacent to the seat and guides the conditioned air to the location adjacent to the seat. The connection duct has one end communicating with the seat air-conditioning duct and an other end communicating with the seat and guides the conditioned air to the seat. The connection duct is bent at a middle part of the connection duct to form a curved portion of which location varies in conjunction with a displacement of the seat. The connection duct is made of a material having great flexibility to have a tubular shape. The connection duct has (i) an outer plate that is located on an outer peripheral side in the curved portion and (ii) an inner plate that is located on an inner peripheral side in the curved portion. A rigidity of the outer plate is higher than a rigidity of the inner plate.

Accordingly, since the inner plate having relatively low rigidity is easily bent, the bend radius of the curved portion can be smaller as compared to a structure in which the bellows portion is arranged to be bent conventionally, and the dimension of the connection duct in the upper-lower direction in condition where the connection duct is being bent can be smaller.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

(First Embodiment)

A first embodiment of the present disclosure will be described.

Figure 1:
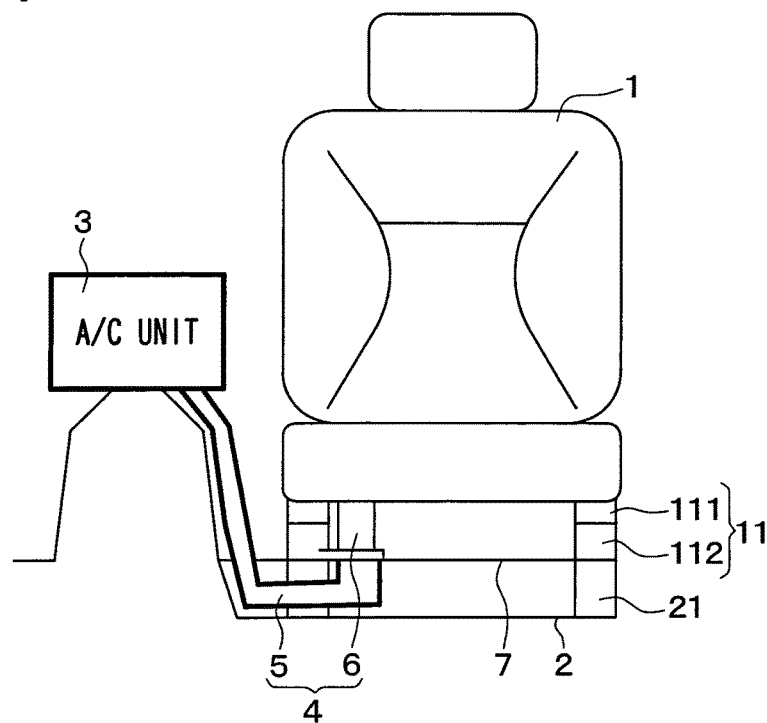
FIG. 1 is a front diagram illustrating a configuration of a vehicle seat air-conditioning device according to a first embodiment.
Figure 2:
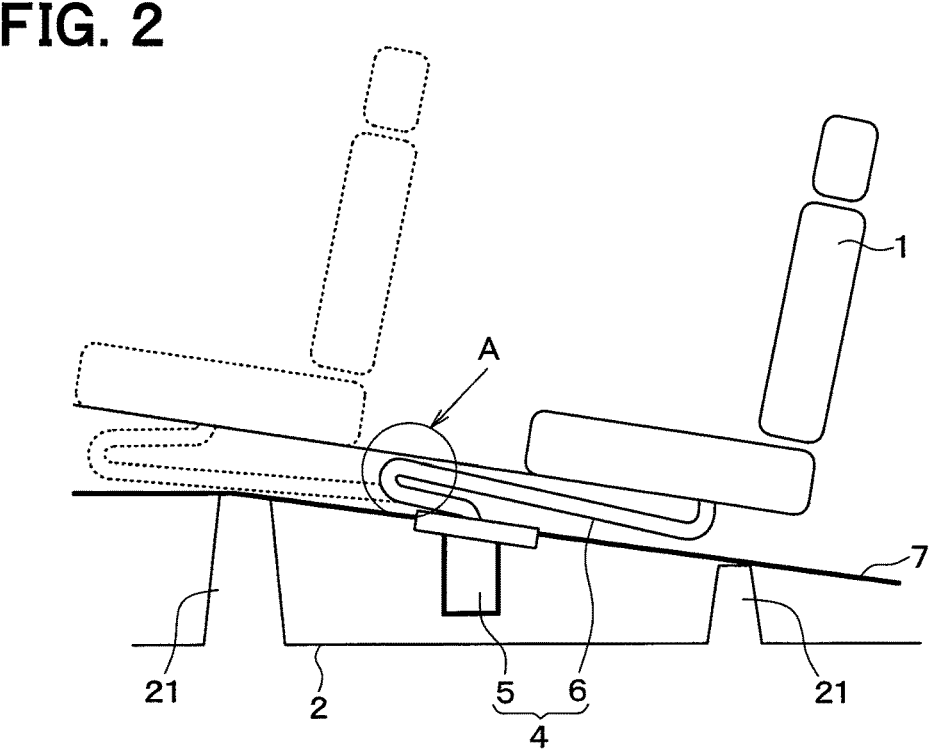
FIG. 2 is a side view illustrating the configuration of the vehicle seat air-conditioning device according to the first embodiment.

As shown in FIGS. 1 and 2, a seat 1 is fixed to a floor 2 of a vehicle body through a seat rail 11. The seat rail 11 adjusts a seating position of the seat 1 in a front-rear direction of a vehicle. The seat rail 11 has an upper rail 111 and a lower rail 112. The upper rail 111 is fixed to a back surface (i.e., a lower surface) of a seat portion of the seat 1. The lower rail 112 is fixed to a cross member 21 that is disposed on the floor 2. The upper rail 111 is slidable in the front-rear direction with respect to the lower rail 112.

A vehicle air conditioner has an interior air-conditioning unit 3 that performs an air conditioning for an indoor space of a vehicle compartment. The interior air-conditioning unit 3 is arranged on an inner side of a dashboard (i.e., an instrument panel) that is located on a foremost area of the vehicle compartment. The interior air-conditioning unit 3 has an air conditioning case that therein houses a blower and various air-conditioning members such as an evaporator and a heater core for a refrigerant cycle. The interior air-conditioning unit 3 adjusts a conditioned air to have a required temperature, and the conditioned air is blown from an outlet into the vehicle compartment through a duct that is connected to the air conditioning case.

A vehicle seat air-conditioning device 4 has a seat air-conditioning duct 5 and a connection duct 6. The seat air-conditioning duct 5 guides the conditioned air of which temperature is adjusted by the interior air-conditioning unit 3 to be a required temperature to a location adjacent to the seat 1. The connection duct 6 guides the conditioned air that is guided by the seat air-conditioning duct 5 to the seat 1.

The seat air-conditioning duct 5 has one end fixed to the interior air-conditioning unit 3 and the other end fixed to the vehicle body under the seat portion of the seat 1. A portion of the seat air-conditioning duct 5 that is close to the seat 1 is arranged between the floor 2 and a carpet 7.

The connection duct 6 has one end fixed to the seat air-conditioning duct 5 and the other end fixed to a back surface (i.e., a lower surface) of the seat portion of the seat 1. As shown in FIG. 2, the connection duct 6 is arranged in condition of being bent in a U-shape at a middle part of the connection duct to form a curved portion, and a location of the curved portion varies in conjunction with a displacement of the seat 1.

The blower of the vehicle seat air-conditioning device 4 is housed inside of the seat portion of the seat 1. The conditioned air drawn by the blower is blown from a surface of the seat portion through an air passage defined in the seat portion and an air outlet formed in the surface of the seat portion.

As shown in FIGS. 3 through 7, the connection duct 6 has a duct body (i.e., a casing) 61, core members 62, and a connector 63.

Figure 4:
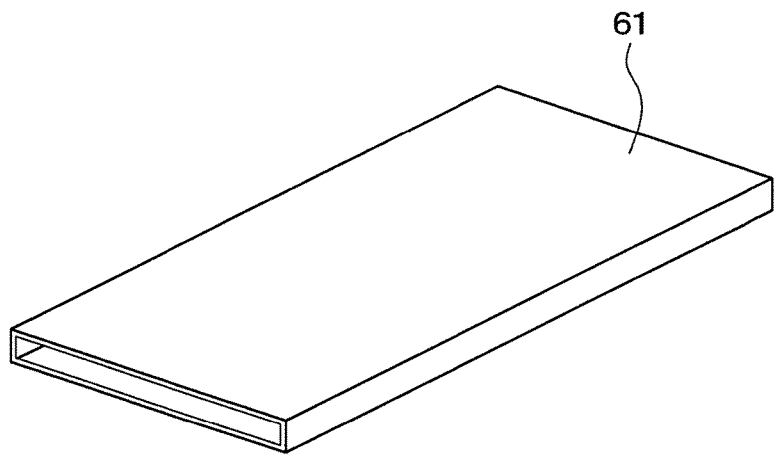
FIG. 4 is a perspective view illustrating a duct body according to the first embodiment.

As shown in FIG. 4, the duct body 61 is formed by a thin film that is made of a material such as vinyl or rubber having great flexibility to have a tubular shape. The conditioned air flows in the duct body 61.

Figure 5:
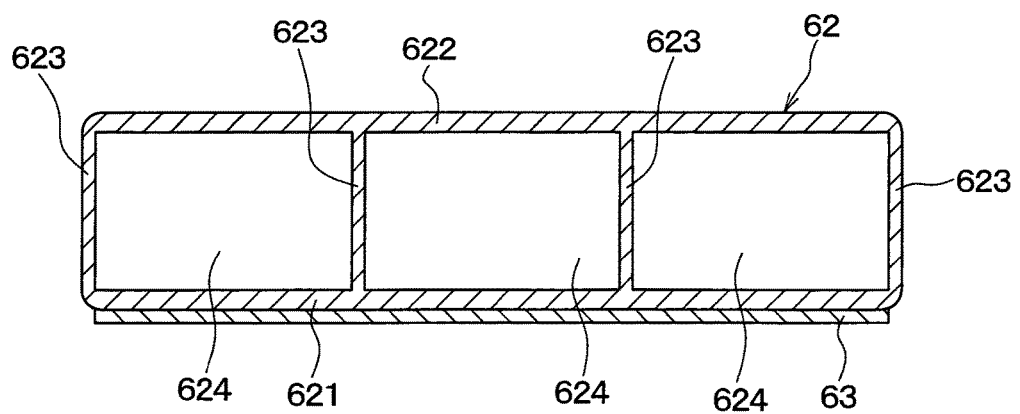
FIG. 5 is a front cross-sectional view illustrating a core members and a connector according to the first embodiment.
Figure 6:
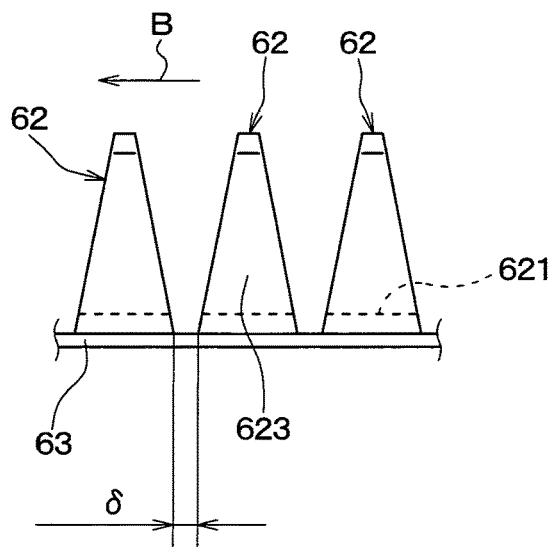
FIG. 6 is a side view illustrating the core members and the connector illustrated in FIG. 5.

As shown in FIG. 5 and FIG. 6, the core members 62 are made of a material such as resin having greater rigidity than the material making the duct body 61.

The core members respectively have an outer plate 621, an inner plate 622, and connection plates 623. The outer plate 621 has a plate shape and is located on an outer peripheral side in the curved portion. The inner plate 622 has a plate shape and is located on an inner peripheral side in the curved portion. The connection plates 623 respectively have a plate shape and connect the outer plate 621 with the inner plate 622.

The outer plate 621 and the inner plate 622 are arranged to face each other and a specified distance away from each other. The core members 62 respectively have a rectangular shape in cross section perpendicular to a flow direction B of air. The outer plate 621, the inner plate 622, and the connection plates 623 define openings 624 through which the conditioned air flows.

A length of the outer plate 621 in the flow direction B is longer than a length of the inner plate 622 in the flow direction B.

The connection plates 623 respectively have a trapezoidal shape in cross section perpendicular to the flow direction B. Specifically, a length of the connection plates 623 in the flow direction B on a side adjacent to the outer plate 621 is longer than a length of the connection plates 623 in the flow direction B on a side adjacent to the inner plate 622.

The connector 63 is made of a material such as vinyl or rubber having great flexibility to have a film shape. The connector 63 is coupled with the outer plate 621 on an outer side of the outer plate 621 by a method such as adhesive bonding and connects the core members 62 to each other. Specifically, the core members 62 are arranged between adjacent two outer plates 621 of adjacent two of the core members 62 to provide a specified clearance δ between the adjacent two outer plates 621. The core members 62 are connected to each other by the connector 63.

Figure 3:
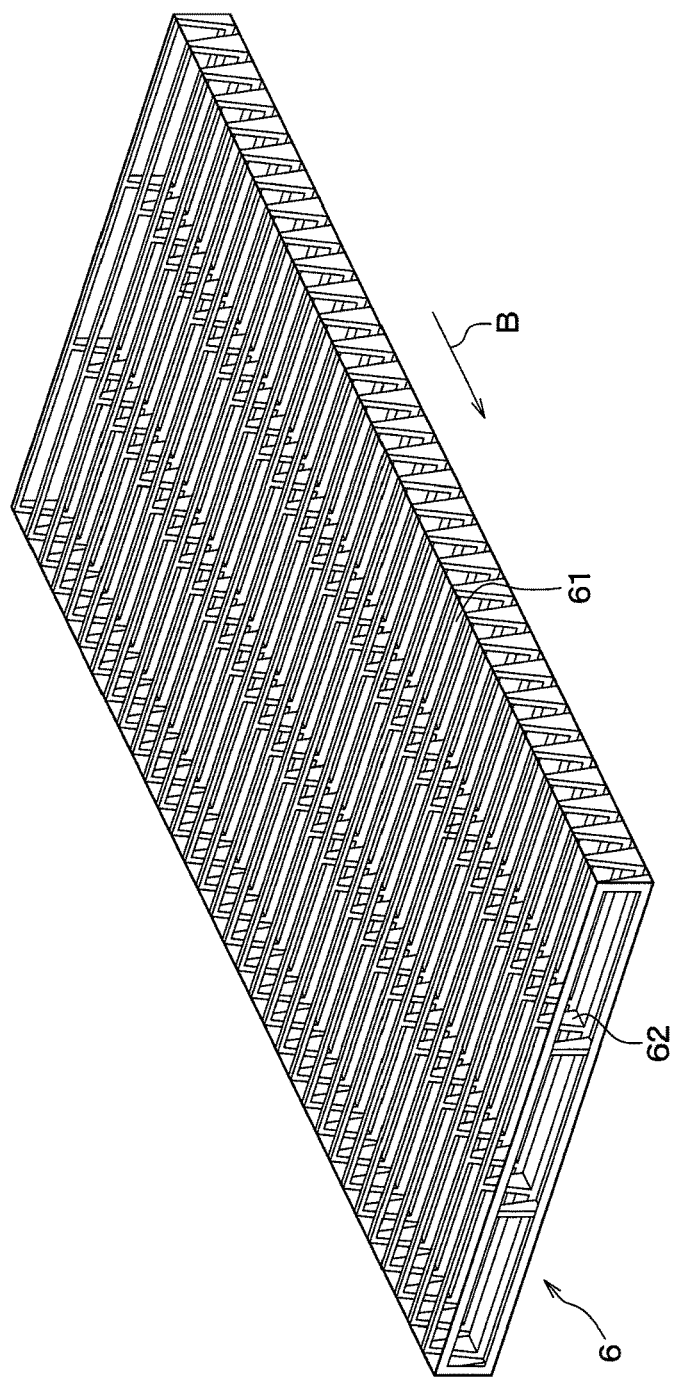
FIG. 3 is a perspective view illustrating a connection duct according to the first embodiment.

As shown in FIG. 3, the core members 62 and the connector 63 in condition of being coupled with each other are inserted to the duct body 61 such that the core members 62 are arranged one after another in the flow direction B. Outer surfaces of the core members 62 and an outer surface of the connector 63 are substantially tightly in contact with an inner surface of the duct body 61. Accordingly, by the connector 63 of which rigidity is greater than the duct body 61, a cross-sectional shape of the duct body 61 in cross section perpendicular to the flow direction B is maintained at a specified cross-sectional shape. Specifically, the cross-sectional shape of the duct body 61 is a rectangular shape similar to the core members 62.

Figure 7:
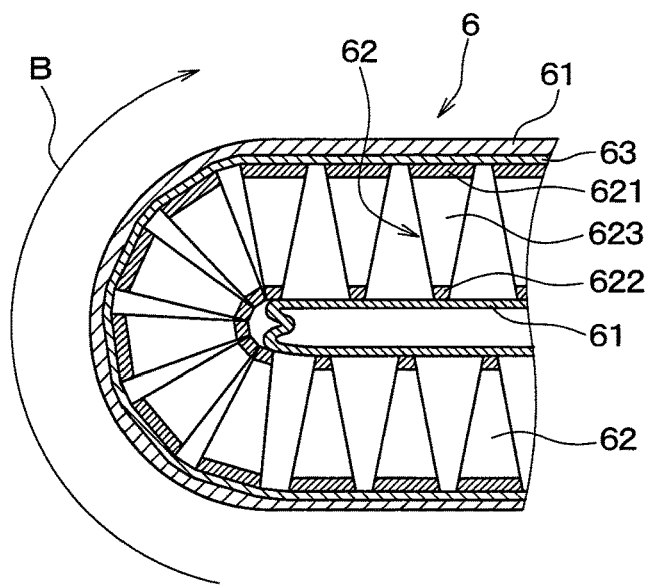
FIG. 7 is an enlarged cross-sectional view illustrating a part A of FIG. 2.
Figure 8:
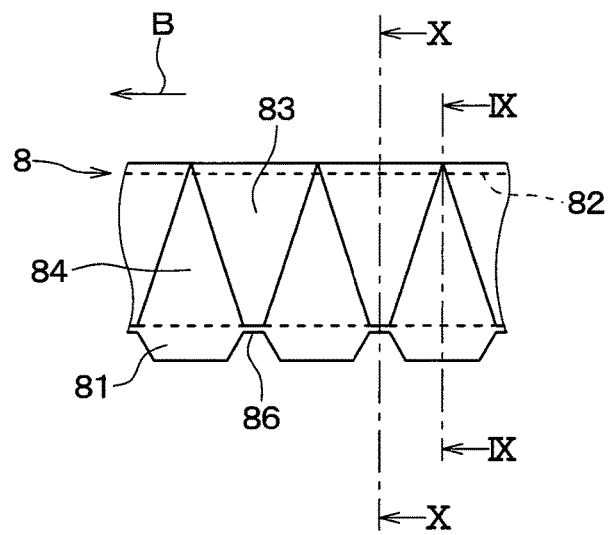
FIG. 8 is lateral cross-sectional view illustrating a connection duct according to a second embodiment.

As described above, the connection duct 6 in condition of therein having the core members 62 and the connector 63 has the one end fixed to the seat air-conditioning duct 5 and the other end fixed to the back surface (i.e., the lower surface) of the seat portion of the seta 1, and is disposed in condition of being bent at the middle part to have the U-shape. FIG. 7 shows the curved portion that is bent to have the U-shape.

Since the duct body 61 is made of a material having great flexibility, the duct body 61 is easily bent. The core members 62 are arranged one after another to provide the specified distance δ between adjacent two outer plate of adjacent two of the core members and connected to each other by the connector 63 that is made of a material having great flexibility. Accordingly, the core members 62 and the connector 63 in condition of being coupled with each other can be bent easily.

Therefore, as shown in FIG. 7, an inner peripheral portion of the duct body 61 in the curved portion is slack, and the connection duct 6 can be bent easily until adjacent two inner plate 622 of adjacent two of the core members 62 are put in condition of being in contact with each other or being close to each other.

As shown in FIG. 2, when the seat 1 is moved, for example, from a position shown by a solid line to a position shown by a dashed line, adjacent pair of the inner plates 622 is put in condition of being in contact with each other or being close to each other one next to other. As a result, a position of the curved portion of the connection duct 6 varies in conjunction with the displacement of the seat 1.

As described above, according to the present embodiment, since the connection duct 6 can be bent easily, a bend radius R of the curved portion can be smaller as compared with a structure in which the bellows portion is disposed to be bent conventionally. Accordingly, a dimension of the connection duct 6 in the upper-lower direction in condition of being bent can be smaller.

Furthermore, since the core members 62 support the duct body 61 to maintain the cross-sectional shape at the specified cross-sectional shape, an obstruction of an air passage in the connection duct 6, which is caused by a buckling of the connection duct 6, can be suppressed.

(Second Embodiment)

A first embodiment of the present disclosure will be described. According to the present embodiment, a structure of the connection duct is different from that of the first embodiment. Other configurations are similar to the first embodiment. Thus, a feature different from the first embodiment will be described hereafter.

As shown in FIGS. 8 through 11, a connection duct 8 has an outer plate 81 and an inner plate 82. The outer plate 81 has a plate shape and is located on an outer peripheral side in the curved portion. The inner plate 82 has a plate shape and is located on an inner peripheral side in the curved portion. The outer plate 81 and the inner plate 82 face each other to be a specified distance away from each other in a direction perpendicular to the flow direction B. A thickness of the outer plate 81 is larger than a thickness of the inner plate 82. Therefore, a rigidity of the outer plate 81 is higher than a rigidity of the inner plate 82.

Figure 9:
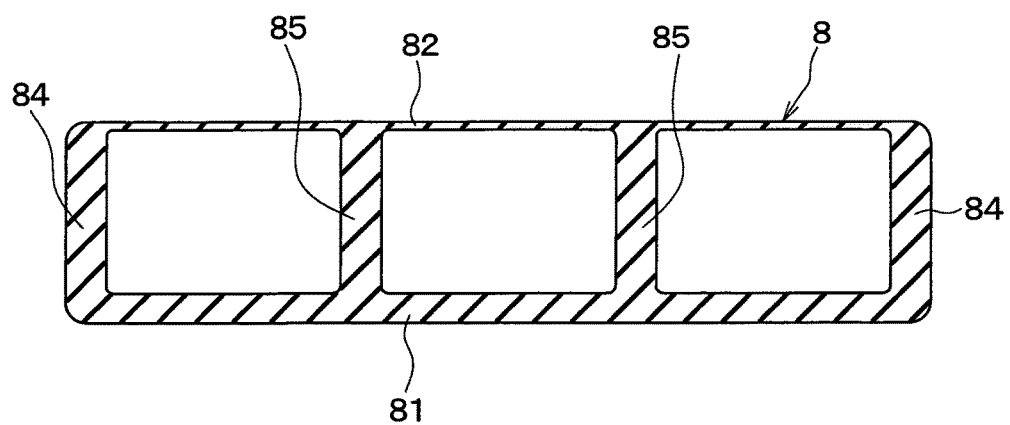
FIG. 9 is a cross-sectional view taken along a line IX-IX shown in FIG. 8.
Figure 10:
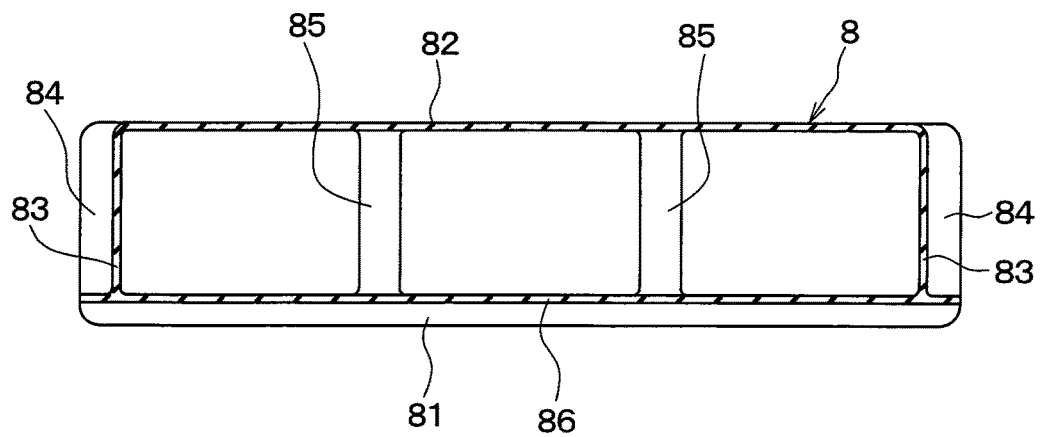
FIG. 10 is a cross-sectional view taken along a line X-X shown in FIG. 8.

As shown in FIGS. 9 and 10, a first side plate 83 and a second side plate 84 are disposed on each side of the outer plate 81 and the inner plate 82 in the direction perpendicular to the flow direction B. The first side plate 83 has a smaller thickness and a low rigidity as compared to the outer plate 81. The second side plate 84 has a larger thickness and a higher rigidity as compared to the first side plate 83.

More specifically, the first side plate 83 has a trapezoidal shape or a triangular shape in cross section perpendicular to the flow direction B. In other words, the first side plate 83 has a length in the flow direction B increasing from the outer plate 81 toward the inner plate 82.

The second side plate 84 has a trapezoidal shape or a triangular shape in cross section perpendicular to the flow direction B. The second side plate 84 has a length in the flow direction B decreasing from the outer plate 81 toward the inner plate 82.

Moreover, the first side plate 83 and the second side plate 84 are arranged alternately in the flow direction B.

The connection duct 8 has a tubular shape defined by the outer plate 81, the inner plate 82, the first side plate 83, and the second side plate 84. The conditioned air flows in the connection duct 8. The connection duct 8 has a rectangular shape in cross section perpendicular to the flow direction B.

A reinforcement plate 85 is disposed in a portion of the connection duct 8 through which the conditioned air flows. The reinforcement plate 85 has a larger thickness and higher rigidity as compared to the first side plate 83. The reinforcement plate 85 has a trapezoidal shape or a triangular shape in cross section perpendicular to the flow direction B. The reinforcement plate 85 has a length in the flow direction B decreasing from the outer plate 81 toward the inner plate 82. The reinforcement plate 85 and the second side plate 84 are arranged to overlap with each other when viewed in the direction perpendicular to the flow direction B.

The outer plate 81 has a recessed portion to provide a thin portion 86 of which thickness is equal to the thickness of the inner plate 82. The thin portion 86 and a top portion of the first side plate 83 are coincident with each other when viewed in the direction perpendicular to the flow direction B.

The connection duct 8 is made of a material such as rubber having great flexibility and formed by the outer plate 81, the inner plate 82, the first side plate 83, the second side plate 84, the reinforcement plate 85, and the thin portion 86 that are in condition of being coupled with each other.

For example, a thickness of the outer plate 81, the second side plate 84, and the reinforcement plate 85 is 2 mm, and a thickness of the inner plate 82, the first side plate 83, and the thin portion 86 is 0.5 mm.

The connection duct 8 having the above-described configuration has one end fixed to the seat air-conditioning duct 5 (see FIG. 2) and the other end fixed to the back surface (i.e., the lower surface) of the seat portion of the seat 1. The connection duct 8 is disposed in condition of being bent at a middle part to have a U-shape.

Figure 11:
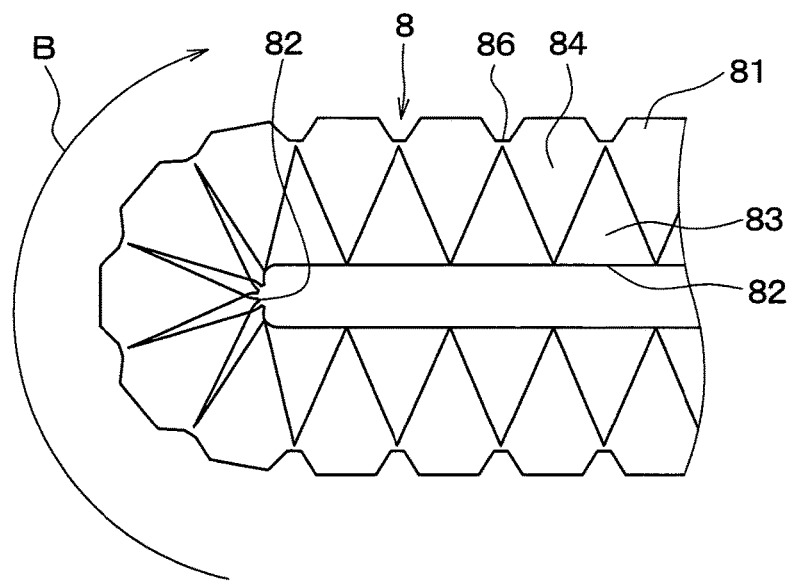
FIG. 11 is a side view illustrating a curved portion of the connection duct according to the second embodiment.

Since the inner plate 82 and the thin portion 86 has a small thickness and low rigidity, the inner plate 82 and the thin portion 86 can be bent easily. Therefore, as shown in FIG. 11, the inner plate 82 is slack in the curved portion, and the connection duct 8 can be bent easily until adjacent two side plates 84 are put in condition of being in contact with each other or being close to each other.

Thus, according to the present embodiment, a dimension of the connection duct 8 in the upper-lower direction in condition of being bent can be smaller similar to the first embodiment.

Furthermore, since the second side plate 84 and the reinforcement plate 85 support the connection duct 8 to maintain the cross-sectional shape at the specified cross-sectional shape, an obstruction of an air passage in the connection duct 8, which is caused by a buckling of the connection duct 8, can be suppressed.

(Other Modifications)

The present disclosure is not limited to the above-described embodiments and can be modified within the scope of the present disclosure as defined by the appended claims.

For example, according to the second embodiment, the connection duct 8 has different rigidities by providing each portions to have different thicknesses. However, the connection duct 8 may have different rigidities by forming the connection duct 8 by two-color molding with rubbers having different hardness.

The above-described embodiments are not unrelated to each other and can be combined with each other except for a case where the combination is clearly improper.

In the above-described embodiments, it is to be understood that elements constituting the embodiments are not necessary except for a case of being explicitly specified to be necessary and a case of being considered to be absolutely necessary in principle.

Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle.

Even when a feature such as a material forming a member, a shape of a member, or a positional relation of members, it is to be understood that such feature is not limited to a specific material, shape, positional relation, or the like except for a case of being explicitly specified to be necessary and a case of being considered to be absolutely necessary in principle.

What is claimed is:

1. A vehicle seat air-conditioning device that blows a conditioned air from a seat, the conditioned air that is supplied from an interior air-conditioning unit that performs an air conditioning for an indoor space of a vehicle compartment, the vehicle seat air-conditioning device comprising:
   a seat air-conditioning duct that has one end communicating with the interior air-conditioning unit and an other end arranged at a location adjacent to the seat, the seat air-conditioning duct that guides the conditioned air to the location adjacent to the seat; and
   a connection duct that has one end communicating with the seat air-conditioning duct and an other end communicating with the seat and guides the conditioned air to the seat, the connection duct that is bent at a middle part of the connection duct to form a curved portion of which location varies in conjunction with a displacement of the seat, wherein
   the connection duct has:
      a duct body that is made of a flexible material, the duct body in which the conditioned air flows along a flow direction; and
      a plurality of core members that are made of a material having a higher rigidity than the duct body and maintain a cross-sectional shape of the duct body at a specified cross-sectional shape, the plurality of core members each having a flat plate shape,
   the plurality of core members are arranged in successive order, in the duct body, each along the flow direction and are parallel with the flow direction to guide the conditioned air to flow along the flow direction,
   the plurality of core members respectively have:
      an outer plate that is located on an outer peripheral side in the curved portion;
      an inner plate that is located on an inner peripheral side in the curved portion; and
      a connection plate that connects the outer plate with the inner plate, and
   a length of the outer plate in the flow direction is longer than a length of the inner plate in the flow direction.

2. The vehicle seat air-conditioning device according to claim 1, further comprising:
   a connector that is made of a flexible material and coupled with the outer plate, the connector connects the plurality of core members to each other.

3. The vehicle seat air-conditioning device according to claim 2, wherein
   the connector connects the plurality of core members to each other to provide a clearance between adjacent two outer plates of the adjacent two core members of the plurality of core members.

4. A vehicle seat air-conditioning device that blows a conditioned air from a seat, the conditioned air that is supplied from an interior air-conditioning unit that performs an air conditioning for an indoor space of a vehicle compartment, the vehicle seat air-conditioning device comprising:
   a seat air-conditioning duct that has one end communicating with the interior air-conditioning unit and an other end arranged at a location adjacent to the seat and guides the conditioned air to the location adjacent to the seat;
   a connection duct that has one end communicating with the seat air-conditioning duct and an other end communicating with the seat and guides the conditioned air to the seat, the connection duct that is bent at a middle part of the connection duct to form a curved portion of which location varies in conjunction with a displacement of the seat, wherein the connection duct is made of a flexible material and defines an air passage that allows the conditioned air to flow therethrough along a flow direction, the connection duct includes
- an outer plate that is located on an outer peripheral side in the curved portion,
- an inner plate that is located on an inner peripheral side in the curved portion and faces the outer plate in a duct height direction perpendicular to the flow direction, and
- two side plates that face each other in a duct width direction perpendicular to both of the flow direction and the duct height direction, the outer plate and the inner plate being interposed between the two side plates in the duct width direction, the two side plates each include
- a plurality of first side plates each being tapered from the inner plate toward the outer plate and
- a plurality of second side plates each being tapered from the outer plate toward the inner plate, the plurality of second side plates protruding outward from the plurality of the first side plates in the width direction perpendicular to the flow direction, the plurality of first side plates and the plurality of second side plates are arranged alternately along the flow direction, each said side plate comprises face sides that each face one of the other face sides of the plurality of second side plates along the flow direction, and a rigidity of the outer plate is higher than a rigidity of the inner plate.

5. The vehicle seat air-conditioning device according to claim 4, wherein a thickness of the outer plate is larger than a thickness of the inner plate.

6. The vehicle seat air-conditioning device according to claim 4, wherein the first side plate has a lower rigidity than the outer plate, and the second side plate has a higher rigidity than the first side plate.

7. The vehicle seat air-conditioning device according to claim 4, wherein the first side plate has a smaller thickness than the outer plate, and the second side plate has a larger thickness than the first side plate.

* * * * *